April 21, 1925.
P. R. RICHARDS
COCK FOR FAUCETS WITH STOP VALVES
Filed May 9, 1923
1,534,327
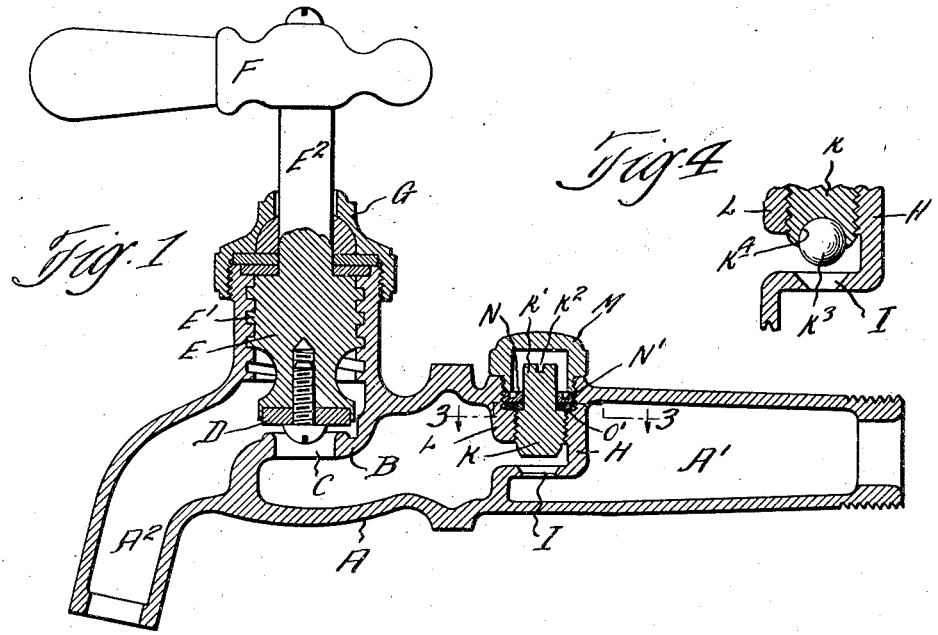
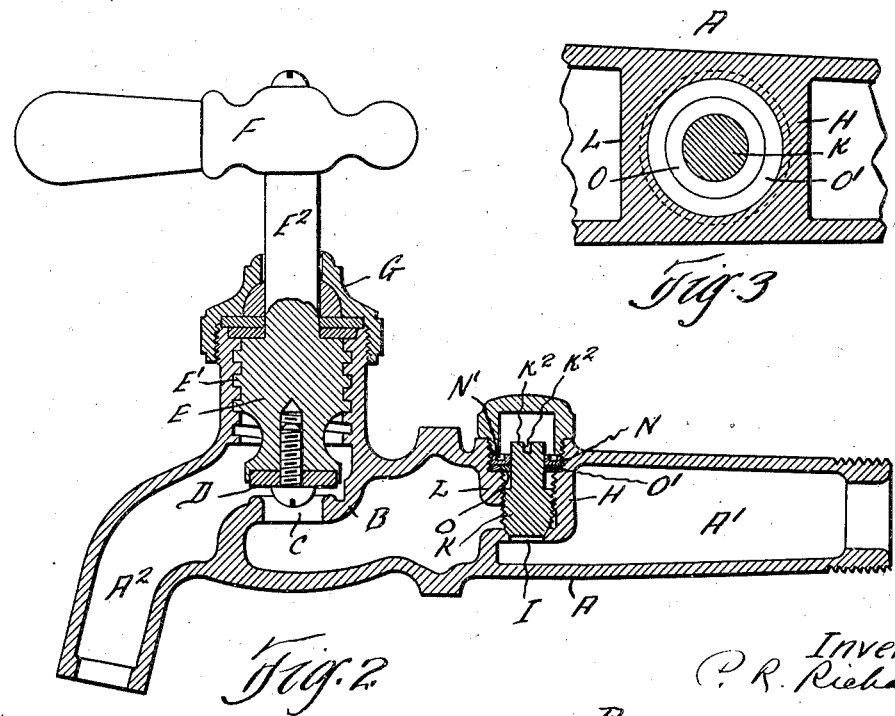
Inventor
P. R. Richards
By
Hull, Brock & West
Attys.

Patented Apr. 21, 1925.

1,534,327

UNITED STATES PATENT OFFICE.

PETER R. RICHARDS, OF CLEVELAND, OHIO, ASSIGNOR TO THE REPUBLIC BRASS COMPANY, OF CLEVELAND, OHIO, A CORPORATION OF OHIO.

COCK FOR FAUCETS WITH STOP VALVES.

Application filed May 9, 1923. Serial No. 637,667.

*To all whom it may concern:*

Be it known that I, PETER R. RICHARDS, a citizen of the United States, residing at Cleveland, in the county of Cuyahoga and State of Ohio, have invented a certain new and useful Improvements in Cocks for Faucets with Stop Valves, of which the following is a full, clear, and exact description, reference being had to the accompanying drawings.

This invention relates generally to cocks and faucets and more particularly to a stop valve arranged in the stem of said cock or faucet for the purpose of cutting off the flow of water while the main valve is being repaired or replaced.

The object of the invention is to provide a simple and highly efficient construction and arrangement of cut-off valve which can be arranged in the main stem of the cock or faucet and which can be quickly and easily operated to open or shut off the supply of water. Another object of the invention is to provide a novel construction of packing means whereby all danger of leakage at the point where the stop valve is arranged is avoided. A still further object is to so construct the valve as to avoid hammering and at the same time provide for proper setting of the stop valve.

With these and various objects in view the invention consists in the novel features of construction and in the manner of combining or arranging the several parts, all of which will be fully described hereinafter and set forth in the appended claims.

In the drawings forming a part of this specification Fig. 1 is a vertical longitudinal sectional view of a cock or faucet constructed in accordance with my invention, the stop valve being shown open; Fig. 2 is a similar view, the stop valve being shown closed; Fig. 3 is a detail sectional view on the line 3—3 of Fig. 1 and Fig. 4 is a detail sectional view of a slightly modified construction of valve. In the practical embodiment of my invention I employ a casing A having a rearwardly extending stem portion A' and a forwardly extending spout portion A². The casing is formed with a subdividing partition or diaphragm B which is apertured as usual and provided with a seat upon which seats the valve D secured to the lower end of the stem E, this stem being enlarged and threaded so as to engage corresponding threads in the casing and the upper reduced end of the stem E² is provided with the operating handle F and the nut or gasket G serves to hold the valve in place and also retain the usual form of packing and stop devices. The elements thus far described are of the usual or ordinary construction except that the stem portion A' is slightly longer than the usual cock or faucet stem. At the point where the casing proper and stem meet there is provided a partition or diaphragm H having an opening I cut therein and shaped to provide a suitable seat for the valve K which is externally threaded and screws into the threaded enlargement L and partition H. The stem is tapped at this point to receive the protecting cap M. The valve K is formed with an upwardly extending stem portion K' which is bifurcated at its upper end as shown at K² in order to receive a screw driver or other tool for the purpose of turning the valve up or down as desired and this stem works through an apertured plate N which is threaded into the threaded opening tapped in the upper side of the stem and this apertured plate N also holds in place the concentric fiber washers O and O', the washer O being fitted close to the stem K' while the washer O² is arranged outside of the washer O and has its outer edges in proximity to the threads of the opening tapped in the stem. The apertured plate N is formed with sockets N' in the upper face thereof to receive a suitable wrench for the purpose of screwing and unscrewing the plate in place.

It will be understood that the main portion of the cock or faucet is constructed and assembled in the usual manner. The valve K is then inserted and the fiber washers placed in position upon the stem K' and within the threaded opening tapped in the upper side of the hollow stem. After the washers have been properly arranged the apertured plate N is fastened in position and the valve K can be turned up or down as desired and then the cap M is secured in place and the device is complete. When the cock or faucet is in use the valve K will of course be open as shown in Fig. 1. When it is desired to repack the main valve or to repair or replace the same the cap M is removed and the valve K screwed down so as to close the opening I. The flow of water is thereby cut off and the repair or replacement desired to the main valve can be accomplished.

After this has been completed the valve K is once more opened and water is permitted to flow to the casing. In addition to serving as a cut-off valve for cutting off the flow of water while the main valve is being repaired or replaced I have found that the valve K can be utilized to regulate the volume of the water passing through the cock or faucet and this feature is valuable particularly in cases where a number of cocks are connected to the same pipe at different levels. With the ordinary cocks and faucets when the lowermost cock or faucet is fully opened the flow through the upper cocks is materially reduced. By adjusting the valve K in the lowermost cock and the upper succeeding cocks this can be avoided.

By the employment of two fiber washers concentrically arranged I prevent all leakage inasmuch as the inner washer O prevents leakage around the stem and the upper washer O' prevents leakage around the edge of the opening.

In case there should be any inaccuracy in the boring of the valve seat I and the proper centering of the valve thereon it can be avoided by providing the valve K with a ball or sphere K³ which is held in a socket K⁴ formed in the end of the valve and inasmuch as this ball or sphere is free to turn it will always find a proper seat irrespective of the accuracy of the valve seat and the proper centering of the valve.

It will thus be seen that I provide an exceedingly simple and highly efficient device in the form of a stop valve which is arranged entirely within the stem of the cock or faucet and all without materially increasing the dimensions of said valve.

Having thus described my invention, what I claim is:

1. A cock or faucet having a partition formed in the stem thereof, said partition being provided with a valve seat, said stem being tapped in alignment with said seat, and also having a threaded enlargement, a stop valve externally threaded and having its inner end adapted to seat upon the valve seat and its outer end extending outwardly a considerable distance, packing surrounding the upwardly projecting end of said stop valve, a disk or plate securing said packing in place and a cap screwed into the faucet stem and protecting the end of the stop valve stem and maintaining the disk in place.

2. A cock or faucet stem having a partition therein said stem being tapped through the upper side and through the partition and providing a valve seat in said partition, a valve having a seat, a threaded portion and a stem, concentric washers surrounding said stem, a disk or plate for holding said washers in place and a cap screwed into the top of the stem and protecting the upper end of the stop valve.

In testimony whereof, I hereunto affix my signature.

PETER R. RICHARDS.